United States Patent [19]
Friedli et al.

[11] Patent Number: 4,484,264
[45] Date of Patent: Nov. 20, 1984

[54] MULTIPROCESSOR SYSTEM

[75] Inventors: Paul Friedli, Zürich; Thomas Hinderling, Ebikon, both of Switzerland

[73] Assignee: Inventio AG, Hergiswil, Switzerland

[21] Appl. No.: 312,659

[22] Filed: Oct. 19, 1981

[30] Foreign Application Priority Data

Oct. 20, 1980 [CH] Switzerland ............... 7798/80

[51] Int. Cl.³ .................................... G06F 15/16
[52] U.S. Cl. .................................... 364/200
[58] Field of Search ... 364/200 MS File, 900 MS File; 187/29 R

[56] References Cited

U.S. PATENT DOCUMENTS

| 3,312,951 | 4/1967 | Hertz | 364/200 |
|---|---|---|---|
| 3,731,765 | 5/1973 | Robaszkiewicz | |
| 3,810,114 | 5/1974 | Yamada et al. | |
| 4,114,730 | 9/1978 | Means et al. | 187/29 R |
| 4,220,990 | 9/1980 | Alles | 364/200 |
| 4,228,496 | 10/1980 | Katzman et al. | 364/200 |
| 4,355,705 | 11/1980 | Schröder et al. | 187/29 R |
| 4,368,514 | 1/1983 | Persand et al. | 364/200 |
| 4,387,424 | 6/1983 | Frediani et al. | 364/200 |

FOREIGN PATENT DOCUMENTS 2517514  4/1975  Fed. Rep. of Germany .

OTHER PUBLICATIONS

"Parallel Computers—Parallel Mathematics", Proceedings of the IMACS (AICA)-Gl, Symposium, Mar. 14–16, 1977, Technical University of Munich. Edited by M. Feilmeier, Technische Universität Braunschweig, Braunschweig, W. Germany, pp. 333 to 337.
Hayes, "Computer Architecture and Organization", 1978, pp. 425–428.

Primary Examiner—James D. Thomas
Assistant Examiner—David L. Clark
Attorney, Agent, or Firm—Werner W. Kleeman

[57] ABSTRACT

The multiprocessor system enables rapid comparison of results determined from input data at the individual microprocessors. During a first phase of the comparison the results which are to be compared are transferred from the individual microprocessors to counters in connection logic components each of which is associated with an individual microprocessor. During a second comparison phase which is started by activating a comparison line to which all the connection logic components are connected via a bus driver, the counters are simultaneously started to count for periods of time each of which corresponds to the result which has been transferred to the respective counter. The comparison line is deactivated by the counter with which the longest counting period is associated. For the purpose of determining the deactivated state, the comparison line is connected to respective inputs of the connection logic components. An interrupt request is produced at that one of the microprocessors which is associated with the counter having the longest counting period. The multiprocessor system can be used, for example, to control the optimum operation of an elevator system.

7 Claims, 5 Drawing Figures

MULTIPROCESSOR SYSTEM

CROSS-REFERENCE TO RELATED APPLICATION

This application is related to the commonly assigned U.S. application Ser. No. 310,589, filed Oct. 13, 1981, entitled "Apparatus for Controlling the Access of Processors at a Data Line".

BACKGROUND OF THE INVENTION

The present invention relates to a new and improved multiprocessor system.

Generally speaking, the multiprocessor system of the present development is of the type composed of a plurality of microprocessors or processors which are connected with a common collecting line serving for data transmission between the individual processors. Each processor or microprocessor is connected by means of a bus composed of address lines, data lines and control lines, with at least one respective read-only memory, read-write memory (RAM) and input-output components.

With such type multiprocessor systems each microprocessor or processor monitors the data transmission operations at the collecting line in consideration of data which is intended for such processor. The data transmitted by means of the collecting line or bus-bar contain, in each case, the addresses of those processors for which there is intended the related data. All microprocessors decode the addresses in order to determine the target processor. These state-of-the-art systems are afflicted with the drawback that they need a great deal of time for their operations, since all processors monitor the collecting line and the addresses must be decoded, and only the target processor is controlled. Additionally, this technique requires a relatively large expenditure in software.

In German Patent Publication No. 2,913,288 there has been taught to the art a multiprocessor system wherein these drawbacks are intended to be avoided. Between each processor and the collecting line there are arranged transmission or transfer devices structured such that the data exchange with the related processor only is accomplished during a predetermined repetitively occurring time interval. In this way the monitoring devices, instead of monitoring the related processors, monitor the collecting line in consideration of interruption requisitions or demands of other processors, so that in each instance there is only interrupted the course of the data processing of the addressed processor.

With the previously described multiprocessor system there can not be optimumly resolved certain data processing functions. If, for instance, there is to be accomplished a comparison of values determined according to the same criteria in the individual processors, then the comparison could be undertaken in each case between two processors, and the result is compared with the value of a further processor. It is possible to work in this fashion until there is determined the processor having, for instance, the smallest value. Depending upon the number of processors this technique requires a great deal of time and there is needed an appreciable expenditure in software. Also, the data transfer by means of the line or bus-bar for other purposes during the comparison interval is markedly limited.

SUMMARY OF THE INVENTION

Therefore, with the foregoing in mind it is a primary object of the present invention to provide a new and improved multiprocessor system which is not afflicted with the aforementioned drawbacks and limitations of the prior art constructions heretofore discussed.

Another and more specific object of the present invention aims at devising a multiprocessor system which is an improvement upon the heretofore described constructions, and which furthermore enables a rapid comparison of processors operating independently of one another, for instance results determined according to the same criteria, and the duration of the comparison operation is independent of the number of processors and the line or bus-bar is not made use of during the data comparison operation.

Now in order to implement these and still further objects of the invention, which will become more readily apparent as the description proceeds, the multiprocessor system of the present development is manifested by the features that, the results to be compared are transmitted to counters in connection logic components each of which is associated with a respective microprocessor. The connection logic components are connected via respective outputs to a comparison line which can be simultaneously activated from all outputs at the start of a comparison operation, the counters simultaneously starting to count at a delay from the moment of activation. The comparison line is deactivated again only when a transfer connection is made by that one of the counters with which the longest counting period is associated. For determining the deactivation the comparison line is in communication with respective inputs of all the connection logic components and an interrupt request can be generated by that one of the microprocessors with which that one of the counters is associated which has the longest counting period.

Some of the more notable advantages which can be obtained when practicing the invention essentially reside in the fact that by means of a single additional line there can be accomplished a rapid comparison of results determined at independently operating processors, and through the use of relatively modest expenditure in software and within the shortest amount of time it is possible to determine the processor having the best result. An additional advantage of the invention resides in the fact that for the coupling of the processors with the line there can be used standardized interface components which are augmented with relatively small expenditure by a connection logic composed of commercially available components.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
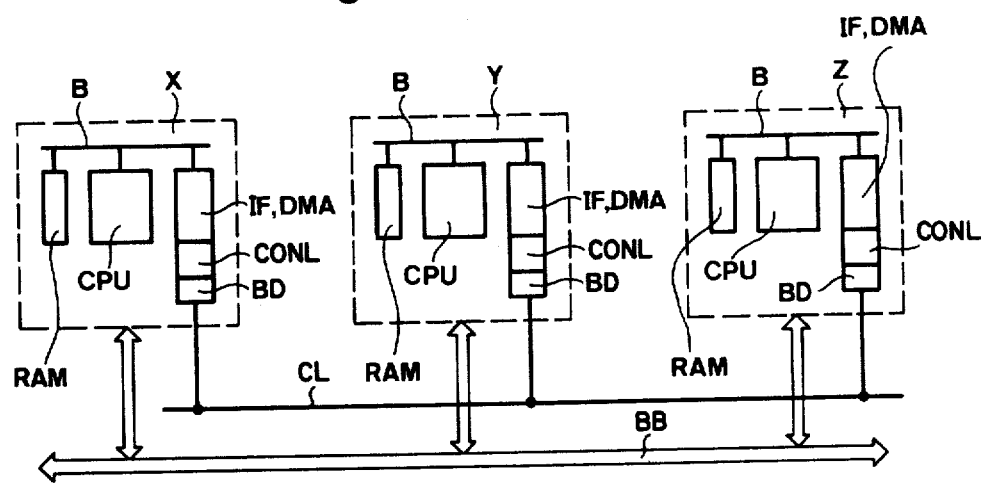
FIG. 1 is a block circuit diagram of a multiprocessor system according to the invention.

Describing now the drawings, in FIG. 1 reference characters X, Y and Z designate three mutually independent microcomputer systems. The microprocessors CPU of the microcomputer systems X, Y and Z are connected in appropriate fashion by means of a bus B composed of address lines, data lines and control lines, with at least one read-write memory or random access memory RAM and not here further illustrated read-only memories and input-output components. For the purpose of data exchange all of the microcomputer systems X, Y and Z are connected in appropriate fashion with a common bus-bar or collecting line BB. Each microcomputer system X, Y and Z is connected by means of a coupling device composed of a parallel interface component or block IF, a DMA-component DMA, meaning direct memory access component or block, a connection logic or connection logic circuit CONL and a bus driver BD with a line CL, which serves for the comparison of values determined according to the same criteria in the individual microprocessors CPU.

Figure 2:
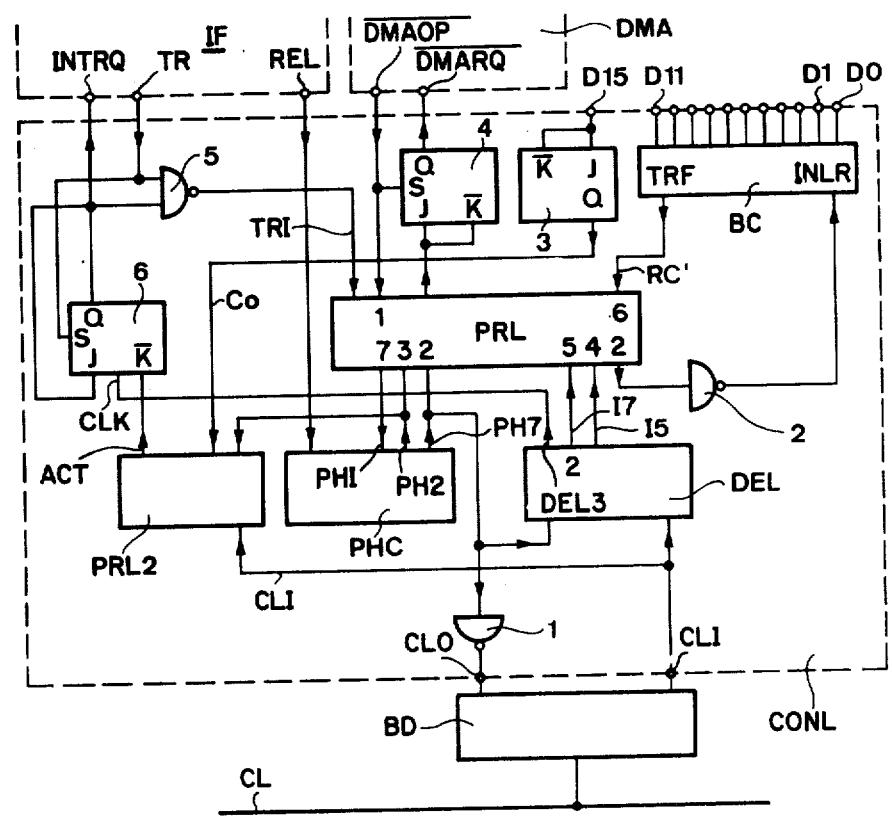
FIG. 2 is a block circuit diagram of a connection logic or logic circuit operatively correlated to each processor or microprocessor of the multiprocessor system.

As best seen by referring to FIG. 2 the connection logic or connection logic circuit CONL possesses an output CLO connected by means of a bus driver BD with the data comparison line CL, referred to herein also as the cost bus CL. This output CLO is connected by means of a first NOT-gate or circuit 1 with the first output PH1 of a counter PHC, designated hereinafter also as a phase counter, and a second input of a first programmable logic arrangement PRL. The phase counter PHC serves for controlling the comparison which is accomplished during a number of phases. At a second output PH2 of the phase counter PHC, and which output PH2 is coupled with a third input of the first programmable logic arrangement PRL, there appears one-half of the signal frequency which is available at the first output PH1. By means of an input of the phase counter PHC, which is connected with an output REL of the parallel interface component IF, there can be freed the counter control. By means of a further input PHI of the phase counter PHC there is input a counter control signal generated by the first programmable logic arrangement PRL. Reference character CLI designates an input of the connection logic CONL which is coupled with the bus driver BD and by means of such bus driver reads the signal state or condition of the cost bus CL. The connection logic is operatively coupled with an input of a time-delay element DEL. At two outputs I5, I7 of the time-delay element DEL, and which outputs are connected with the first programmable logic arrangement PRL, there appears the step-shaped time-delayed signal of the input CLI of the connection logic CONL.

A binary counter, designated hereinafter as the cost counter BC, possesses twelve parallel inputs D0–D11, which are directly connected with the data lines of the bus B of the related microprocessor system X, Y and Z. During a comparison operation there are loaded into the cost counter BC the values to be compared in the form of a 12-bit binary number BK. The cost counter BC possesses an incrementing connection INCR and a transfer or carry connection TRF. The incrementing connection INCR is coupled by means of a second NOT-gate or element 2 with a second output and the transfer connection TRF is connected to a sixth input of the first programmable logic arrangement PRL. An input D15 of the connection logic CONL which transmits during the comparison operation a further bit Co is connected, on the one hand, with a data line of the bus B and, on the other hand, with the inputs J, $\bar{K}$ of a first JK-flip-flop 3, whose output Q is coupled with an input of a second programmable logic arrangement PRL2.

Reference numeral 4 designates a second JK-flip-flop, whose inputs J, $\bar{K}$ are connected with a further output of the first programmable logic arrangement PRL and whose output Q is connected with an input DMARQ of the DMA-component DMA, this input reading a DMA-requisition or requirement signal. An output DMAOP of the DMA-component DMA, and which signals a continuous DMA-operation, is coupled with a first input of the first programmable logic arrangement PRL and with a set-connection of the JK-flip-flop 4. By means of an output TR of the parallel interface component IF, which is connected by means of a NAND-element or gate 5 with a further input TRI of the first programmable logic arrangement PRL, there can be triggered a DMA-operation.

The signal appearing at the outputs of the first programmable logic arrangement PRL connected to the further input PHI of the phase counter PHC, to the DMARQ input of the DMA-component and to the INCR connection serve for controlling the phase counter PHC. The signals appearing at the DMARQ input and at the second ouput of the first programmable logic arrangement PRL, representing the DMA-requisition or demand and the triggering of the incrementing operation of the cost counter BC are generated as a function of the signals appearing at the previously described inputs in accordance with the following logical equations:

$$\overline{PHI} = PH1.\overline{I5}.I7 + \overline{PH1}.PH2.I5.I7 + \overline{PH1}.PH2.I5.\overline{I7} + CLKA$$

wherein $$CLKA = \overline{PH1}.PH2.TRF + \overline{PH1}.PH2.\overline{DMAOP}$$

$$\overline{ARQO} = \overline{PH1}.\overline{PH2}.\overline{TRI}.DMAOP.I7;$$
$$\overline{ENG} = \overline{PH1}.PH2.I7$$

A third JK-flip-flop 6, whose output Q is connected with its first input J as well as with the second input of a NAND-gate or element 5 and an input INTRQ of the parallel interface component IF, is coupled by means of its second input $\bar{K}$ at an output ACT of the second programmable logic arrangement PRL2. By means of the input INTRQ of the parallel interface component IF there can be transmitted an interruption requirement or demand appearing at the output Q of the third JK-flip-flop 6. By means of a set-input S connected with the input TR of the parallel interface component IF there can be again extinguished the interruption requirement or demand. The clock connection CLK of the third JK-flip-flop 6 is connected to a third output DEL3 of the time-delay element DEL, which possesses a further input connected to the first output PH1 of the phase counter PHC, wherein the signal present at its input appears with a time-delay at the third output DEL 3 of the time-delay element.

The second programmable logic arrangement PRL2 possesses further inputs connected with the second output PH2 at the phase counter PHC and with the input CLI of the connection logic CONL. The signal appearing at the output ACT is produced as a function of the signals appearing at the previously described inputs in accordance with the following logical equation:

$$\overline{ACT} = PH2.CLI.Co + PH2.\overline{CLI}.\overline{Co}$$

The terminals and connections which are needed for inputting the clock signal to the connection logic CONL have been omitted from the drawings in order to facilitate the presentation and for clarity in the showing of the circuitry. The described digital logic coupling elements and components are commercially available devices, wherein, for instance, there can be used for the DMA-component, the parallel interface component IF and the bus driver BD those available from Texas Instrument under Type TMS9911, TMS9901 and SN75138. The signals appearing at the different inputs and outputs of the components, and there is to be expressly also understood signal sequences or trains, have been designated with the same reference characters as the related inputs and outputs.

Having now had the benefit of the foregoing description of the multiprocessor system of the invention its mode of operation, during a data comparison operation, will be considered and is as follows:

It is assumed by way of example and not limitation that the microcomputer system X, Y and Z are correlated to the individual elevators or lifts of a group of elevators composed of three elevators, and the microcomputer systems can serve both for the drive control and regulation and also, for instance, for the timewise optimization of the correlation of elevator cabins to the storey or floor calls. In the last-mentioned case each microcomputer system computes from certain elevator-specific parameters, such as for instance the distance between a considered call storey and the elevator cabin, the number of possible intermediate stops which are to be expected within such distance predicated upon the existing elevator cabins and storey calls already correlated to such elevator cabins as well as the momentary cabin load, a time-proportional sum BK. This sum BK, in the form of a binary number, and corresponding to the service capability of an elevator cabin with respect to the considered call or calling storey, is written into a random access memory or read-write memory RAM of the related microcomputer system X, Y and Z, and wherein the address of the storage place corresponds to the number of the momentarily considered calling storey. During a comparison of the sums $BK_x$, $BK_y$, $BK_z$ of the microcomputer systems X, Y and Z, and which comparison is carried out for such storey or floor, the elevator cabin having the smallest sum BK, corresponding to the smallest loss-time of waiting passengers, is allocated to the considered calling storey or floor of the building or structure service by the elevator cabins.

Figure 3:
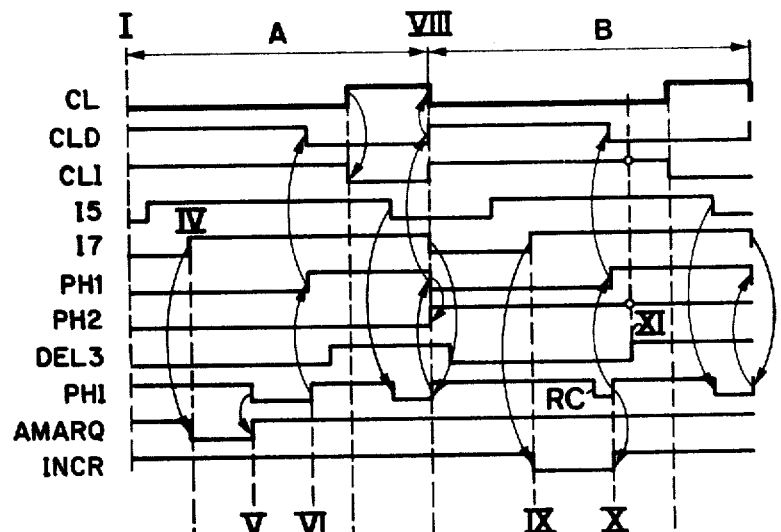
FIG. 3 is a diagram showing the course as a function of time of the signals of the connection logic of a first processor (X) and a data comparison line.
Figure 4:
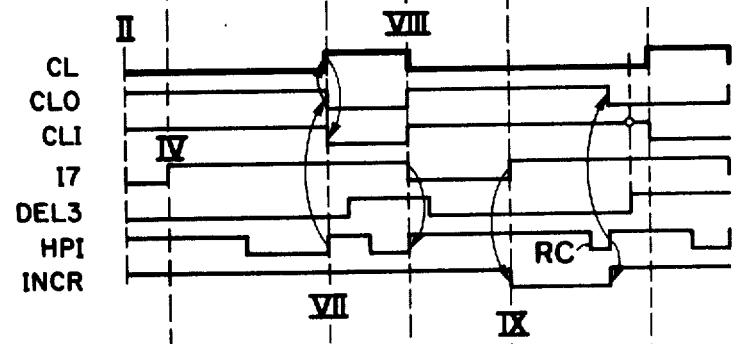
FIG. 4 is a diagram illustrating the course as a function of time of a part of the signals shown in FIG. 3 of the connection logic of a second processor (Y) and the data comparison line.

The comparison is accomplished in a number of timewise successive phases. During a first phase A there are controlled all parallel interface components IF by a synchronization signal emanating from a microprocessor CPU and transmitted by means of the bus-bar BB to all other microprocessors of the system. Hence, there appears a signal change at the output REL of the parallel interface components IF at approximately the same time intervals or times I, II, III (FIGS. 3, 4 and 5), whereupon there is released the control of the phase counter PHC. With the initially accomplished release, for instance that of the phase counter PHC of the microcomputer system X, there is activated the cost bus CL, and it is capable of possessing a low potential (time I, FIG. 3). The output CLO and the input CLI of the connection logic CONL, designated hereinafter as the comparison output CLO and the comparison input CLI, are thus set at a high potential. After the release of the last phase counter PHC (time III, FIG. 5) there occurs at a time IV (FIGS. 3, 4 and 5) determined by means of the time-delay element DEL and signalling with a time-delay the activation of the cost bus CL, at all of the microcomputer systems X, Y and Z at the same time a change of the output signal I7. At the DMARQ output of the first programmable logic arrangement PRL there occurs a signal change and there is produced by means of the second JK-flip-flop 4 a DMA-requisition or requirement signal. The individual DMA-components then signal in appropriate fashion to the momentarily correlated microprocessor CPU that they desire the control over the data bus. This is accomplished after a certain latent time, and the DMA-component delivers a signal at the output DMAOP (time V, FIG. 3), at the start of which the further phase counter-control input PHI is set low and the DMARQ output controlling the DMA-requirement is set high. During the duration of the at the output DMAOP the DMA-component delivers an address to the address bus, so that a storage place of the read-write or random access memory RAM containing the sums BK which are to be compared is caused to respond, whereupon the memory or storage place content is transferred by means of the data bus and the inputs D0-D11 into the cost counter BC. At the same time there is transferred by means of the input D15 a control bit Co and stored in the first JK-flip-flop 3. In this context Co=1 signifies that the related microcomputer system X, Y and Z, during the preceding comparison of the same storey or floor, has determined and stored the smallest sum BK. By the same token Co=0 means that the related microcomputer system X, Y and Z does not possess the smallest sum BK. After the, for instance, initially accomplished termination of the data transfer of the microcomputer system X and the disappearance of the signal at the DMAOP output, the control signal at PHI and the first phase signal at PH1 of the phase counter PHC goes high (time VI, FIG. 3), so that the corresponding comparison output CLO of the connection logic CONL is set low. After completion of the data transfer of the last of all of the microcomputer system, for instance the microcomputer system Y, the potential of the cost bus CL is set high and all of the comparison inputs CLI are set low (time VII, FIG. 4).

Following a time-delay of the signal CLI, governed by the time-delay element DEL, the signals I5 and I7 successively go to a lower potential, and the phase counter-control signal at PHI first is set at a lower and then at a higher potential. As a consequence the first phase signal at PH1, the second phase signal at PH2 and the signal at CLO of all microcomputer systems X, Y and Z simultaneously change, so that the cost bus CL is again activated and there is initiated a second phase B of the comparison (time VIII, FIGS. 3, 4 and 5). Since at this point in time the cost bus CL changes to a lower potential and all of the comparison inputs CLI to a higher potential, also the signal I7, after a certain time-delay is set high, and by means of the first programmable arrangement PRL there is brought about a change of the signal at INCR and there is simultaneously initiated an incrementing operation of all of the cost counters BC (time IX, FIGS. 3, 4 and 5).

It is here assumed that the cost counter BC of the microcomputer system X (FIG. 3) contains the largest sum BK and thus, the smallest complement $\overline{BK}$. This cost counter BC therefore will be the first to produce a signal at the transfer connection TRF, and there occurs a double change of the phase counter-control signal at PHI which causes the setting of the first phase signal at PH1 at a high potential, and thus, the comparison output CLO of the related connection logic CONL at a lower potential as well as a change of the signal at INCR which terminates the incrementizing operation (time X, FIG. 3). Furthermore, it is assumed that the microcomputer system X, predicated upon the last comparison, has determined the smallest sum BK, and the control bit Co=1. In this case, since the cost bus CL still exhibits a low potential and all comparison inputs CLI as well as the second phase signal at PH2 controlling the second phase B exhibits a high potential (time X, FIG. 3), there is initiated by means of the second programmable logic arrangement PRL2 a change of the signal ACT at the second input $\overline{K}$ of the third JK-flip-flop 6. Upon change of the clock signal at DEL 3 appearing with a time delay with respect to the first phase signal at PH1 at the clock connection CLK of the third JK-flip-flop 6 (time XI, FIG. 3) there is produced at its output Q an allocation interruption by means of which the microprocessor CPU of the microcomputer system X, by means of the input INTRQ of the parallel interface component IF, is caused to change the control bit Co which is stored in the random access memory or read-write memory RAM in addition to the sum BK, from a logical state "1" to the logic state "0".

Figure 5:
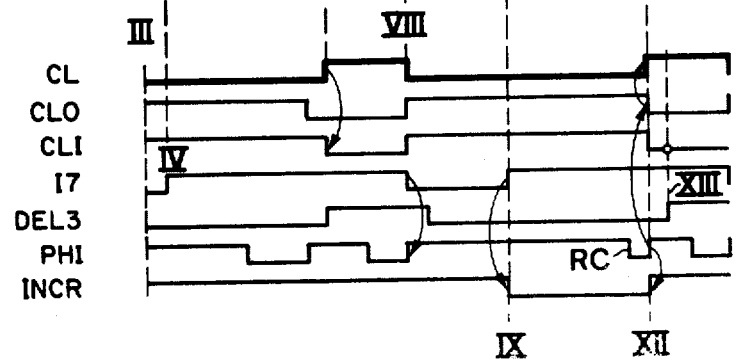
FIG. 5 is a diagram showing the course as a function of time of the signals according to FIG. 4 of the connection logic of a third processor (Z) and the data comparison line.

It is further assumed that the microcomputer system Z (FIG. 5), during the preceding comparison, has stored the control bit Co=0, but however during the momentary comparison possesses the smallest sum BK, and thus, the greatest complement $\overline{BK}$, so that here the transfer is produced last (time XII, FIG. 5). Consequently, the first phase signal at PH1 and the cost bus CL go to a high potential and the comparison output CLO as well as all comparison inputs CLI go to a low potential. Upon change of the clock signal of the third JK-flip-flop 6 (time XIII, FIG. 5) appearing with a time-delay with respect to the first phase signal at PH1, there is likewise produced at its output Q an allocation interruption by means of which the microprocessor CPU of the microcomputer system Z is caused to change, by means of the input INTRQ of the parallel interface component IF, the control bit Co which has been stored in the read-write or random access memory RAM, in addition to the sum BK, from a logic state "0" to the logic state "1". Thus, as already previously mentioned, the elevator associated with the microcomputer system Z can be allocated to the considered calling storey or floor and can service such storey of the building.

If the comparison during the phase B indicates that a number of systems have determined exactly the same sums BK, then in a further third phase C there can be determined the optimum system by means of a suitable device which determines the priority.

While there are shown and described present preferred embodiments of the invention, it is to be distinctly understood that the invention is not limited thereto, but may be otherwise variously embodied and practiced within the scope of the following claims. Accordingly,

What we claim is:

1. A multi-microcomputer system comprising:
    a plurality of microcomputers;
    a common bus bar;
    said plurality of microcomputers being connected to said common bus bar which transmits a synchronization signal generated by one of said microcomputers between the individual microcomputers in order to synchronize said microcomputers for a subsequent comparison operation;
    each said microcomputer having stored therein data and computing results from said data stored in said microcomputer in terms of a preselected parameter;
    each said microcomputer comprising a microprocessor, a read-write memory, a coupling member and a bus interconnecting said microprocessor, said read-write memory and said coupling member;
    each said result computed by a related one of said microcomputers being stored in the related read-write memory at a related storage location thereof;
    each said coupling member comprising a DMA-component, an interface component, a connection logic component and a bus driver;
    a comparison line interconnecting the bus drivers of the coupling members;
    said DMA-component of each coupling member being connected to said connection logic component thereof and to said bus in order to generate a DMA requirement signal after the appearance of said synchronization signal whereupon the computed result stored in said storage location of the related read-write memory is transferred to said connection logic component;
    said interface component and said DMA-component of each coupling member being connected in parallel to said connection logic component and operatively connecting via said bus said connection logic component and said microprocessor of such microcomputer;
    said connection logic component of each coupling member being connected to said bus and being connected to said comparison line via said bus driver thereof;
    said connection logic component of each coupling member comprising related comparison signal generating means;
    each said comparison signal generating means receiving a related one of said computed results and generating, after said microcomputers have been synchronized and after the related computed result has been transferred to said connection logic components and after the comparison line has been activated and all the comparison signal generating means have been started simultaneously, a related comparison signal of a duration which corresponds to the magnitude of said related computed result;
    said comparison signal generating means producing comparison signals of different durations and that one of said connection logic components associated with the comparison signal generating means generating the comparison signal of longest duration deactivating said comparison line and producing an interruption requirement signal which indicates an optimum value of the result computed by the related microcomputer with respect to said preselected parameter and the remaining connection logic components which generate a comparison signal of shorter duration producing an interruption requirement signal indicating a non-optimum value of the results computed by the related microcomputers.

2. The multi-microcomputer system as defined in claim 1, wherein:
   each said connection logic component contains a counter;
   said counter constituting said comparison signal generating means;
   each said bus containing address, data and control lines; and
   each said counter being directly connected to the data lines of said bus to receive, after occurrence of said synchronization signal delivered by one of the microcomputers and transmitted via the bus-bar to all of the remaining microcomputers, said computed result stored in the related read-write memory in the form of a binary number.

3. The multi-microcomputer system as defined in claim 2, wherein:
   each said comparison signal constitutes the complement of said binary number and said duration of said comparison signal constituting an incrementing period during which said counter counts said complement in an incrementing operation.

4. The multi-microcomputer system as defined in claim 2, wherein:
   each said DMA-component has an input and an output;
   each said connection logic component possessing a further counter, a time-delay element, a first programmable logic arrangement, an input and an output;
   said further counter having an input, a further input, a first output and a second output;
   said time-delay element having an input, a first output, a second output, and a third output;
   said first programmable logic arrangement having a first input, a second input, a third input, a fourth input, and a fifth input;
   said first programmable logic arrangement having a first output;
   said first programmable logic arrangement being connected at said first input thereof to said output of the DMA-component signaling termination of transmission of the binary number to said counter;
   said first programmable logic arrangement being further connected at said second input and third input thereof to said first output and said second output, respectively, of said further counter;
   said first programmable logic arrangement being connected at said first output thereof to said further input of said further counter and at said fourth and said fifth input thereof to said first output and said second output, respectively, of said time-delay element;
   said first output of said further counter being connected via said first NOT-element to said output of said connection logic component;
   said input of said time-delay element being connected to said input of said connection logic component;
   said input and said output of said connection logic component being connected by means of said bus driver to said comparison line;
   said counters of all of said connection logic components receiving respective ones of said binary numbers in a predetermined time sequence;
   a signal change occurring at the further input and at the first output of the further counter of each connection logic component and at the output of such connection logic component upon said termination of the transmission of its related binary number, and upon said termination of the transmission of the last one in said time sequence of said binary numbers there additionally and simultaneously occurs a first signal change on the comparison line and at the same time at all of the inputs of said connection logic components; and
   after said first signal change on said comparison line there occurs a signal change at the first and second outputs of the time-delay element at a time delay predetermined by said time-delay element, and said time-delay element causing a second signal change on the comparison line and at the same time at all of the outputs and inputs of said connection logic components.

5. The mutli-microcomputer system as defined in claim 4, wherein:
   each said connection logic component further comprises a second NOT-element;
   each said first programmable logic arrangement has a sixth input and a second output;
   each said counter has an incrementing connection connected by means of said second NOT-element to said second output of its related first programmable logic arrangement;
   each said counter having a transfer connection connected to said sixth input of the related first programmable logic arrangement;
   after a further signal change at the first and second outputs of the time-delay element, which further signal change occurs at a time delay predetermined by said time-delay element after said second signal change on the comparison line, there appears at the second outputs of all of the first programmable logic arrangements a signal change at which all of the counters simultaneously begin an incrementing operation during which there is counted the complement of the binary number transmitted to the related counter which complement constitutes said comparison signal; and
   upon termination of said incrementing operation each said counter activating said transfer connection thereof and by means of said first programmable logic arrangement producing a signal change at the further input and at the first output of the related further counter and at the output of the related connection logic component, and upon termination of the incrementing operation and activation of said transfer connection by that one of said counters which counts the largest complement of the binary numbers transmitted to the counters, there simultaneously occurs a third signal change on the comparison line and at all of the inputs of said connection logic components in order to generate said interruption requirement signal indicating said optimum value of the result computed by the related microcomputer.

6. The multi-microcomputer system as defined in claim 5, wherein:

each said connection logic component possesses a first JK flip-flop, a further JK flip-flop and a second programmable logic arrangement;

said first JK flip-flop having an input connected to said data line of said bus of the related microcomputer and having an output;

each said interface having an interruption requirement input;

said further JK flip-flop having an output connected to said interruption requirement input of said interface and having an input and a clock connection;

said second programmable logic arrangement having a first input connected to said input of the related connection logic component, a second input connected to said second output of said further counter, a third input connected to said output of said first JK flip-flop, and an output connected to said input of said further JK flip-flop;

said first JK flip-flop storing therein a control bit which is transmitted simultaneously with said binary number and which signals either said optimum or said non-optimum value of said result computed by the related microcomputer;

each said time-delay element possessing a further input connected with the first output of the related further counter and possessing a third output which is coupled with said clock connection of the further JK flip-flop; and after said signal change at the further input and at the first output of the further counters due to the activation of the transfer connections of the related counters, there occurs a signal change at said third outputs of the related time-delay elements, upon whose occurrence prior to the third signal change on the comparison line there is generated an interruption requirement at the outputs of the related further JK flip-flops which signal a non-optimum result computed by the related microcomputers and upon whose occurrence after the third signal change there is generated said interruption requirement at the output of the related further JK flip-flop which signals an optimum result computed by the related microcomputer.

7. A multi-microcomputer system comprising:

a predetermined number of microcomputers;

a common bus bar to which said microcomputers are connected and which transmits synchronization signals to said microcomputers in order to synchronize said microcomputers for a subsequent comparison operation;

each said microcomputer having stored data therein and computing results from said stored data;

each said microcomputer comprising a related read-write memory in which a related computed result is stored at a related storage location, a microprocessor, a coupling member and a bus to which said read-write memory, said microprocessor and said coupling member are connected;

said bus including address lines, data lines and control lines;

a comparison line interconnecting said coupling members of said microcomputers;

each said coupling member comprising:

an interface having a release output and an interrupt request input;

a direct memory access component having a direct memory access request input;

a connection logic component including a counter connected to said data lines of said bus, an interrupt request output connected to said interrupt request input of said interface, a direct memory access request output connected to said direct memory access request input of said direct memory access component, a time delay element, and an output and an input connected to said comparison line;

each said computed result stored in a related storage location of the related read-write memory being transmitted after occurence of said synchronization signal to a related one of said counters by means of a related direct memory access operation and stored therein in the form of a binary number;

each said connection logic component performing said comparison operation in which said binary number is compared to the corresponding binary numbers transmitted to the counters in the related other connection logic components;

each said output and each said input at the related connection logic component signalling the start and the end, respectively, of said comparison operation;

respective bus drivers connecting the input and output of each said connection logic component to said comparison line;

said comparison line being simultaneously activated by all said outputs of all said connection logic components at the start of said comparison operation and each one of said counters in the related connection logic components being started so as to count at a time delay predetermined by the related time delay element after said start of the comparison operation the complement of said binary number stored in said counter and counting for a counting period which depends on the magnitude of the respective binary number stored in the counter;

said comparison line being deactivated by that one of said counters which has the longest complement counting period and simultaneously signalling the end of said comparison operation at all said inputs of said connection logic components; and said connection logic component with which said counter having the longest counting period is associated, producing an interrupt request signal at said interrupt request output.

* * * * *

UNITED STATES PATENT AND TRADEMARK OFFICE
CERTIFICATE OF CORRECTION

PATENT NO. : 4,484,264

DATED : November 20, 1984

INVENTOR(S) : PAUL FRIEDLI et al

It is certified that error appears in the above-identified patent and that said Letters Patent is hereby corrected as shown below:

Column 6, line 33, after "the" (first occurrance)
  insert --signal--

Signed and Sealed this

Ninth Day of April 1985

[SEAL]

Attest:

DONALD J. QUIGG

Attesting Officer — Acting Commissioner of Patents and Trademarks